Patented July 30, 1946

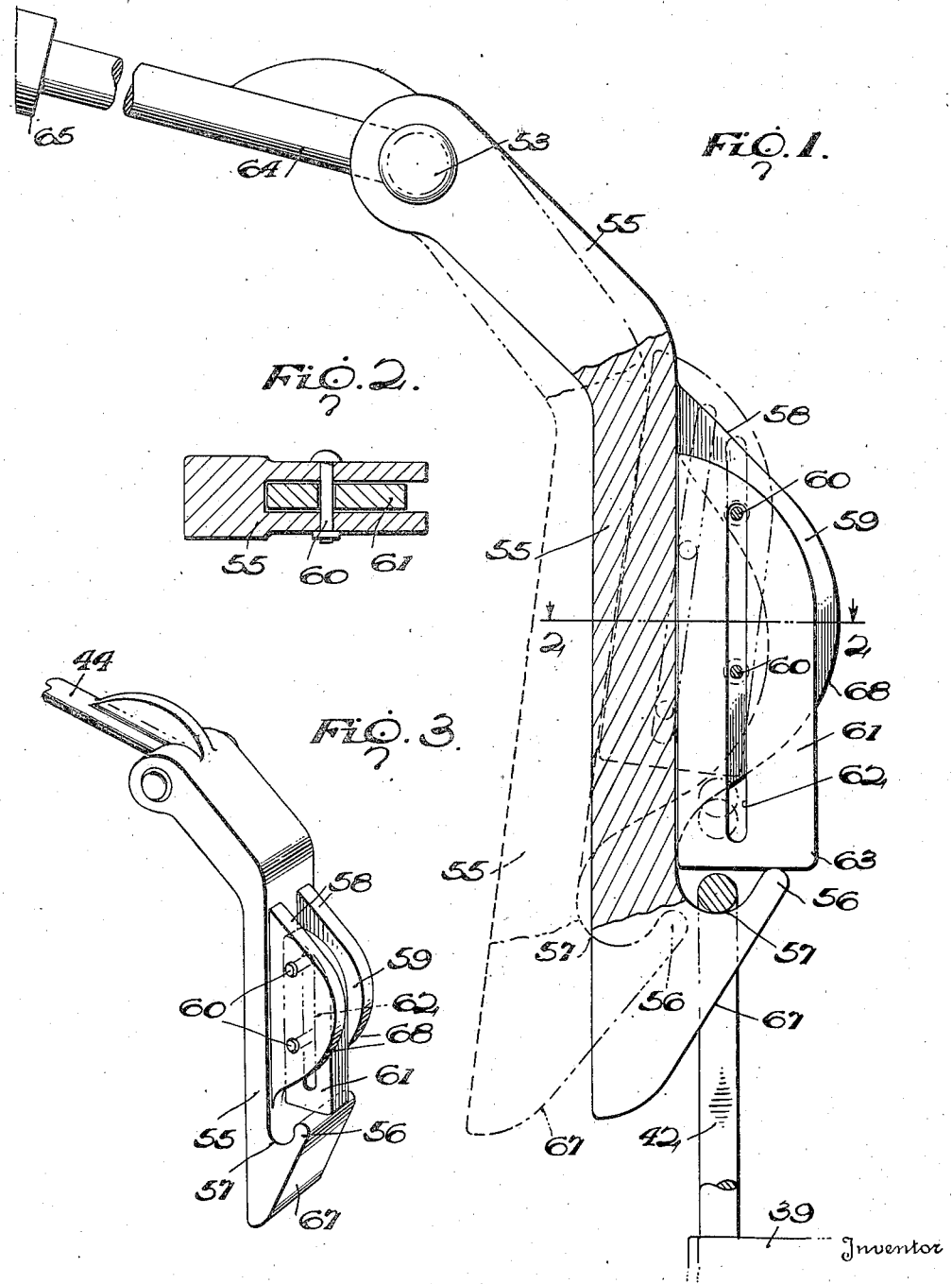

2,404,830

UNITED STATES PATENT OFFICE 2,404,830

AUTOMATIC HOOK

George R. Dempster, Knoxville, Tenn.

Original application April 26, 1943, Serial No. 484,636, now Patent No. 2,369,722, dated February 20, 1945. Divided and this application November 7, 1944, Serial No. 562,311

5 Claims. (Cl. 294—83)

This invention relates to automatic hooks, and more particularly to automatic hooks of the type employed in transporting and dumping equipment, such for example as disclosed in my application Serial No. 484,636, filed April 26, 1943, of which this application is a division, but it is to be expressly understood that the present invention is not limited to use with equipment as disclosed in the identified application, but is of utility wherever an automatic hook is desired for engagement with and disengagement from a suitable element movable into and out of cooperation therewith as hereinafter explained.

It is an object of this invention to provide an automatic hook of simple and rugged construction which is easily fabricated and installed, certain in action and flexible in use.

The invention is capable of receiving a variety of mechanical expressions, one of which is shown somewhat diagrammatically on the accompanying drawing, but it is to be expressly understood that the drawing is for purposes of illustration only, and is not to be construed as definitions of the limits of the invention, reference being had to the appended claims for that purpose.

Referring in detail to the accompanying drawing, wherein the same reference characters are used to designate corresponding parts in the several figures, Fig. 1 is an enlarged elevation, partly broken away, of the active end of the improved automatic hook;

Fig. 2 is a cross section on the line 2—2 of Fig. 1; and

Fig. 3 is a perspective view, reduced in size, of the active end of the automatic hook.

As shown, said automatic hook includes a rearwardly and downwardly inclined body member 55 pivoted at 53 and having at one face an upwardly extending projection 56 so as to provide a curved dwell 57 for cooperation with any suitable element such as a bail 42 on a container 39 to be supported therefrom. The same face of member 55 carries in spaced relation a pair of lugs 58 whose outer curved periphery constitutes a cam as will be explained. Extending transversely of the slot 59 formed by and between said lugs 58 are a pair of pins 60 retained in said lugs in any suitable way. Slidably mounted on said pins 60 is a rectilinearly movable shuttle plate 61 having a longitudinal slot 62 therethrough and through which extend the pins 60. Plate 61, as shown in Fig. 1, has a width such that it overhangs the projection 56, as shown at 63, so that it may be engaged by the bail 42 in a manner to be described. Body member 55 is also provided with a forwardly extending rod 64 which may carry a counterweight 65 to normally balance said hook on its pivotal axis 53 so that the hook will be in the path of movement of the bail 42 or other element to be engaged and operate as now to be explained.

Assuming that the hook is to be actuated by a bail on a container for engagement therewith to support the container, as the bail 42 is lifted it engages the upwardly inclined edge 67 of the body member 55 of the hook and cams the hook from the position shown in full lines in Fig. 1 toward the position shown in dotted lines, this movement of the hook being against the action of gravity as controlled by the counterweight on arm 64. When the bail reaches the upper extremity of the inclined surface 67 it engages the lower overhanging edge 63 of the reciprocating shuttle plate 61 and slides the latter upwardly on the pins 60 until the bail has reached an elevation above the projection 56. Thereupon the counterweight swings the automatic hook about its pivot 53 causing the projection 56 to enter the bail so that the dwell 57 is beneath the bail. When the bail is then lowered it is engaged with the dwell 57 which stops its downward movement, the reciprocating shuttle plate 61 following the bail in its downward movement and locking the bail in the hook against displacement. When the bail is to be disengaged from the hook it is moved upwardly, sliding the shuttle plate 61 upwardly on its pins 60 until the bail reaches the intermediate position diagrammatically indicated in dotted lines in Fig. 1, at which time it is in contact with the curved cam edge 68 of the lugs 58. Continued upward movement of the bail 42 cams the hook to the left as viewed in Fig. 1 until the bail moves out of vertical alignment with the lower edge of the shuttle plate 61, whereupon the latter falls by gravity and closes the entrance to the hook so that upon downward movement of the bail the latter cannot reengage the hook. Thus the bail is automatically disengaged from the hook and can be readily lowered out of cooperative relationship therewith.

It will therefore be perceived that the present invention provides an automatic hook that is composed of a relatively few simple and rugged parts and that it is so constructed that the hook is strong and durable as well as certain and efficient in operation.

While the embodiment of the invention illustrated on the drawing has been described with considerable particularity, it is to be expressly understood that the invention is not restricted thereto as other embodiments of the invention will now be readily suggested to those skilled in the art by the foregoing disclosure, while changes may be made in the details of construction, arrangement and proportion of parts, without departing from the spirit of this invention.

What is claimed is:

1. An automatic hook including a pivoted body member having a projection thereon carrying a counterweight, said body member being shaped to provide a dwell and having cam surfaces operable by an element to be engaged for deflecting said body member out of the path of said element as said element moves into and out of operative relationship to said hook, and a rectilinearly movable shuttle plate for masking the entrance to said dwell.

2. An automatic hook including a pivoted body member having a projection thereon carrying a counterweight, said body member being shaped to provide a dwell and having cam surfaces operable by an element to be engaged for deflecting said body member out of the path of said element as said element moves into and out of operative relationship to said hook, and a rectilinearly movable shuttle plate for masking the entrance to said dwell, said shuttle plate having its lower edge projecting laterally of the hook for engagement with the element to be engaged by the hook to be slid upwardly thereby for opening the entrance to said dwell.

3. An automatic hook including a pivoted body member having a projection thereon carrying a counterweight, said body member being shaped to provide a dwell, said hook having rearwardly projecting lugs providing a slot therebetween, guide means carried by said lugs, a slotted shuttle plate reciprocatingly mounted on said guide means for masking the entrance to said dwell, and cam means on said body member operable by an element to be engaged for deflecting said member as said element moves into and out of operative relationship to said hook.

4. An automatic hook including a pivoted body member having a projection thereon carrying a counterweight, said body member being shaped to provide a dwell, said hook having projecting lugs providing a slot therebetween, guide means carried by said lugs, a slotted shuttle plate reciprocatingly mounted on said guide means for masking the entrance to said dwell, the bottom edge of said plate projecting beyond said hook and said hook having a cam surface whereby upward movement of the element to be engaged first cams said hook laterally and then displaces said shuttle plate to permit movement of said hook into cooperative relationship with said element under the gravitational action of said counterweight.

5. An automatic hook including a pivoted body member having a projection thereon carrying a counterweight, said body member being shaped to provide a dwell, said hook having projecting lugs providing a slot therebetween, guide means carried by said lugs, a slotted shuttle plate reciprocatingly mounted on said guide means for masking the entrance to said dwell, the bottom edge of said plate projecting beyond said hook and said hook having a cam surface whereby upward movement of the element to be engaged first cams said hook laterally and then displaces said shuttle plate to permit movement of said hook into cooperative relationship with said element under the gravitational action of said counterweight, the faces of said lugs providing a second cam surface for cooperation with said element whereby upward movement of said element out of said dwell cams said hook laterally to a position wherein said shuttle plate drops by gravity to close the entrance to said dwell.

GEORGE R. DEMPSTER.